(12) United States Patent
Limbaugh

(10) Patent No.: US 10,875,031 B2
(45) Date of Patent: Dec. 29, 2020

(54) FINE PARTICULATE COMPOSITIONS COMPRISING NON-COMPOSTED COCONUT COIR PITH AND PROCESS FOR THEIR PREPARATION

(71) Applicant: Midwest Organics Inc., Sikeston, MO (US)

(72) Inventor: Jeff Limbaugh, Sikeston, MO (US)

(73) Assignee: Midwest Organics Inc., Sikeston, MO (US)

( * ) Notice: Subject to any disclaimer, the term of this patent is extended or adjusted under 35 U.S.C. 154(b) by 95 days.

(21) Appl. No.: 15/983,341

(22) Filed: May 18, 2018

(65) Prior Publication Data

US 2018/0264481 A1 Sep. 20, 2018

Related U.S. Application Data

(63) Continuation-in-part of application No. 15/053,931, filed on Feb. 25, 2016, now abandoned.

(51) Int. Cl.

| | |
|---|---|
| *C05G 5/12* | (2020.01) |
| *C05G 3/80* | (2020.01) |
| *C09K 17/16* | (2006.01) |
| *C05F 3/00* | (2006.01) |
| *C05D 9/00* | (2006.01) |
| *B02C 23/08* | (2006.01) |
| *A01K 1/015* | (2006.01) |
| *B01D 17/02* | (2006.01) |
| *C02F 1/28* | (2006.01) |
| *B01D 39/04* | (2006.01) |
| *B01D 39/20* | (2006.01) |

(Continued)

(52) U.S. Cl.
CPC ............ *B02C 23/08* (2013.01); *A01K 1/0154* (2013.01); *A01K 1/0155* (2013.01); *B01D 17/0202* (2013.01); *B01D 39/04* (2013.01); *B01D 39/2055* (2013.01); *B01J 20/28004* (2013.01); *B01J 20/3021* (2013.01); *C02F 1/286* (2013.01); *C05D 9/00* (2013.01); *C05F 3/00* (2013.01); *C05G 3/80* (2020.02); *C05G 5/12* (2020.02); *C09K 17/16* (2013.01); *B01D 2239/1241* (2013.01); *B01J 2220/485* (2013.01); *C02F 2101/32* (2013.01); *C02F 2103/08* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 6,189,260 B1 * | 2/2001 | Kusey | C05F 5/002 47/9 |
| 6,408,568 B1 | 6/2002 | Kusey et al. | |

(Continued)

OTHER PUBLICATIONS

B.P. Kelleher et al., Advances in poultry litter disposal technology—a review, Elsevier, Aug. 6, 2001, Bioresource Technology 83 (2002) 27-36.

(Continued)

*Primary Examiner* — Wayne A Langel
(74) *Attorney, Agent, or Firm* — Dunlap Codding, P.C.

(57) ABSTRACT

A method for processing raw coconut coir pith into fine particles having a size range of from 0.001 mm to 7 mm and the use of such fine particles directly or in formulated form in agricultural, industrial and commercial applications.

5 Claims, 3 Drawing Sheets

(51) Int. Cl.
    *B01J 20/30*         (2006.01)
    *B01J 20/28*         (2006.01)
    *C02F 101/32*       (2006.01)
    *C02F 103/08*       (2006.01)

(56) References Cited

U.S. PATENT DOCUMENTS

| | | | | |
|---|---|---|---|---|
| 6,596,324 | B1* | 7/2003 | Homan | A01N 65/26 |
| | | | | 424/761 |
| 6,863,027 | B1* | 3/2005 | Silva | A01K 1/0155 |
| | | | | 119/171 |
| 8,256,160 | B2* | 9/2012 | Rubin | C05F 5/002 |
| | | | | 47/58.1 SC |
| 2003/0070623 | A1* | 4/2003 | MacQuoid | A01K 1/0152 |
| | | | | 119/171 |
| 2004/0025422 | A1* | 2/2004 | MacQuoid | C05F 5/002 |
| | | | | 47/9 |
| 2005/0028839 | A1* | 2/2005 | MacQuoid | B01J 20/24 |
| | | | | 134/7 |
| 2005/0230316 | A1* | 10/2005 | Arnott | A62C 3/06 |
| | | | | 210/691 |
| 2008/0223302 | A1* | 9/2008 | Wang | A01K 1/0155 |
| | | | | 119/173 |
| 2009/0113791 | A1* | 5/2009 | Bertin | C05F 5/002 |
| | | | | 47/9 |
| 2016/0183492 | A1* | 6/2016 | Norman | A01K 1/0152 |
| | | | | 119/166 |
| 2017/0208772 | A1* | 7/2017 | Nga | A01K 1/0155 |
| 2018/0014459 | A1* | 1/2018 | Roberts | B01J 20/22 |

OTHER PUBLICATIONS

George V. Thomas et al., Co-composting of coconut coir pith with solid poultry manure, Current Science, Jan. 25, 2013, vol. 104, No. 2, Research Communications, pp. 245-250.

\* cited by examiner

TABLE 1

|  | C.C.* | Dry |
|---|---|---|
| Density, lbs./cu.ft. | 120.0 | 96.0 |
| Water Retention, vol. % | 38.4 | |
| Air Space, vol. % | 0.7 | 39.2 |
| Water Retention, % dry wt | 25 | |
| Saturated Bulk Density | 120.5 lbs/cu.ft. | |

*Container Capacity Determined using 6 inch Column

TABLE 2

|  | C.C.* | Dry |
|---|---|---|
| Density, lbs./cu.ft. | 97.1 | 62.8 |
| Water Retention, vol. % | 55.1 | |
| Air Space, vol. % | 2.2 | 57.3 |
| Water Retention, % dry wt | 55 | |
| Saturated Bulk Density | 98.5 lbs/cu.ft. | |

*Container Capacity Determined using 6 inch Column

FINE PARTICULATE COMPOSITIONS COMPRISING NON-COMPOSTED COCONUT COIR PITH AND PROCESS FOR THEIR PREPARATION

CROSS REFERENCE TO RELATED APPLICATIONS AND INCORPORATION BY REFERENCE STATEMENT

This is a continuation-in-part of U.S. Ser. No. 15/053,931, filed Feb. 25, 2016, the entirety of which is hereby expressly incorporated herein by reference.

BACKGROUND OF THE INVENTION

I. Field of the Presently Disclosed Inventive Concepts

The presently described and claimed inventive concept(s) relate to methods for processing raw coconut coir pith into fine particles for horticultural and agricultural use, and for other uses. More particularly, the described and claimed inventive concept(s) relate to methods for producing and formulating finely ground coir pith particles for use directly in a variety of industrial and commercial applications, including horticultural and agricultural applications, without the need to first compost and/or stabilize the coconut coir pith. The described and claimed inventive concept(s) also relate to a method for processing poultry manure with finely ground raw coir pith particles into granules, balls or prill value for agriculturally and horticulturally acceptable uses.

II. Background

U.S. Pat. No. 6,408,568 B1 describes compressed mixtures of blends of coconut coir pith and selected horticulturally acceptable non-coir/non-peat materials. Blended compositions are described in which coconut coir pith is combined with selected horticulturally acceptable non-coir pith, non-peat moss additive materials. The blended compositions are then compressed for sale as baled products, but then must subsequently be de-compressed and fluffed prior to use.

Coir is the name given to the fibrous material that constitutes the thick mesocarp (middle layer) of the coconut fruit (*Cocos nucifera*). In processing, long fibers of coir are extracted from the coconut husk for use in the manufacture of brushes, upholstery stuffing, filters, twine and like products. Short fibers (e.g., in the range of from 7 mm to 2 mm or less) and dust (particulates ranging in size from a few molecules to 0.02 mm in size and referred to herein as "pith") are traditionally accumulated in large piles or "dumps" as a waste product that results from the processing of coconut husks to obtain the more industrially valuable long fibers.

Studies have been conducted to explore the feasibility for utilizing coir pith waste material by co-composting it with other materials, such as solid poultry manure, to yield an agriculturally acceptable manure product. Results of the feasibility studies indicate that shortcomings of fresh, i.e., raw, coir pith (e.g., high C:N ratio, undesirable lignin and polyphenol content) can be overcome via co-composting.

A need exists for improving known methods for processing, i.e., utilizing, raw coir pith directly and for developing new applications and uses for raw coir pith. The described and claimed inventive concept(s) provide not only an improved method for processing raw coconut coir pith into fine particulates which are useful in a variety of end products, for example, in kitty or cat litter, without the need for a first composting step, but also provide an agriculturally and horticulturally acceptable method for improving utilization of poultry litter, i.e., poultry manure comingled with rice hulls and an effective amount of raw coconut coir pith fine particulates.

SUMMARY OF THE INVENTION

The described and claimed inventive concept(s) provide according to one embodiment a method for processing raw coconut coir pith into fine particles having a size range of from 0.001 mm to 0.02 mm. According to an alternate embodiment the processing method yields fine particles of raw coconut coir pith having a size range of from 0.001 mm up to 7 mm, although 5 mm is a preferred upper limit for certain applications, such as in oil absorption. The fine particles are suitable for use directly as a soil additive without the need for composting or further processing. The method comprises:

(a) providing a quantity of raw coconut coir pith wherein said raw coconut coir pith has a pH in the range of from 5.7 to 6.5 and a sodium salt content of not more than 0.03 wt %;

(b) grinding the raw coconut coir pith to form a ground product;

(c) screening the ground product in a screening system comprising a first screen at a first mesh arranged to receive the ground product from step (b) and a second screen at a second mesh smaller than the first mesh and arranged to receive the ground product which passes from the first screen, said screening system including three outlets positioned within the system with the result that fibers pass into the first outlet, non-fiber intermediate product, i.e., particulates larger than 0.02 mm, passes into the second outlet and said fine particles, having a size range of from 0.001 mm to 0.02 mm, pass into the third outlet; and (d) collecting the fine particles.

Raw coconut coir pith is typically provided in compressed block form with each block weighing about 5 kg and measuring about 12" by 12" by 4". The blocks are conveyed via an automated belt feed system into one or more crushing machines having carbide grinding teeth. It has been observed for best results that the raw coconut coir pith should have a neutral pH, meaning a pH in the range of from 5.7 pH to 6.5 pH, and a sodium salt content of not more than 0.03 wt %.

The fine raw coconut coir pith particles can be used directly as a soil additive without the need for further processing or compacting, or the fine particles can be formulated and packaged for a variety of other high value industrial and commercial uses as will be described in greater detail below.

According to another embodiment, the described and claimed inventive concept(s) comprise a method for separating hydrocarbon liquids from fresh or salt water that has been contaminated with one or more of such hydrocarbon liquids. Such hydrocarbon liquids can include, for example, crude oil or diesel or other fuels and other hydrocarbon liquids and chemicals. The method comprises applying a quantity of fine raw coconut coir pith particles having a size range of from 0.001 mm to 0.05 mm to the contaminated water with the result that hydrocarbon liquid and/or liquid chemical present in or on the contaminated water is absorbed by the raw coconut coir pith particles, similar to a sponge absorbing a liquid. In an alternate embodiment the size range of raw coconut coir pith particles for hydrocarbon absorption can range from 0.001 mm up to 7 mm. The quantity of coconut coir pith particles now saturated with hydrocarbon liquid is then recovered from the water using any convenient means, such as, for example, skimming or filtering. Thereafter, the hydrocarbon liquid can be recovered from the coconut coir pith particles, or the saturated coconut coir pith particles can be disposed of, by any convenient means.

Recovery options include, but are not limited to, passing the saturated coconut coir pith through a belt press with the result that the absorbed liquid(s) are effectively squeezed from the coir pith solids for collection. A centrifuge can also be used for liquid extraction. Saturated coconut coir pith can also be dried naturally and then incinerated or used to generate power or heat.

According to another embodiment, the inventive concept(s) comprise mixtures or blends of the raw coconut coir pith fine particulates, which typically range in size from 0.001 mm up to 7 mm, with horticulturally acceptable non-coir materials selected from one or more natural or synthetic fertilizers; one or more carbon based materials; animal or poultry manure; poultry litter; one or more binding materials, and mixtures thereof. The mixtures or blends can be converted into granules, balls or prills for ease of handling and application for a variety of end uses, such as, for example, farming, commercial and residential landscaping, and golf courses.

According to another embodiment, the inventive concept(s) comprise a method for processing poultry manure from a poultry house for agriculturally and horticulturally acceptable end uses which comprises: (a) covering the floor of a poultry house with a depth of rice hulls of at least about one inch; (b) introducing a flock of poultry into the poultry house for a poultry growing cycle of up to twelve months; (c) recovering the rice hulls and all resulting poultry manure in the form of poultry litter at the end of the poultry growing cycle; (d) formulating the recovered poultry litter with up to 5 wt % raw coconut coir pith fine particles having a size range of from 0.001 mm up to 5 mm or even 7 mm and from 5 wt % up to 15 wt % of one or more additives selected from the group consisting of water; one or more natural or synthetic fertilizers; one or more carbon based materials; one or more binding materials, and mixtures thereof to form a bulk formulated product; and (e) converting the bulk formulated product into granules, balls or prills for ease of handling and application. End uses include, for example, farming, commercial and residential landscaping, and golf courses

DETAILED DESCRIPTION OF THE INVENTIVE CONCEPT(S)

Figure 1:
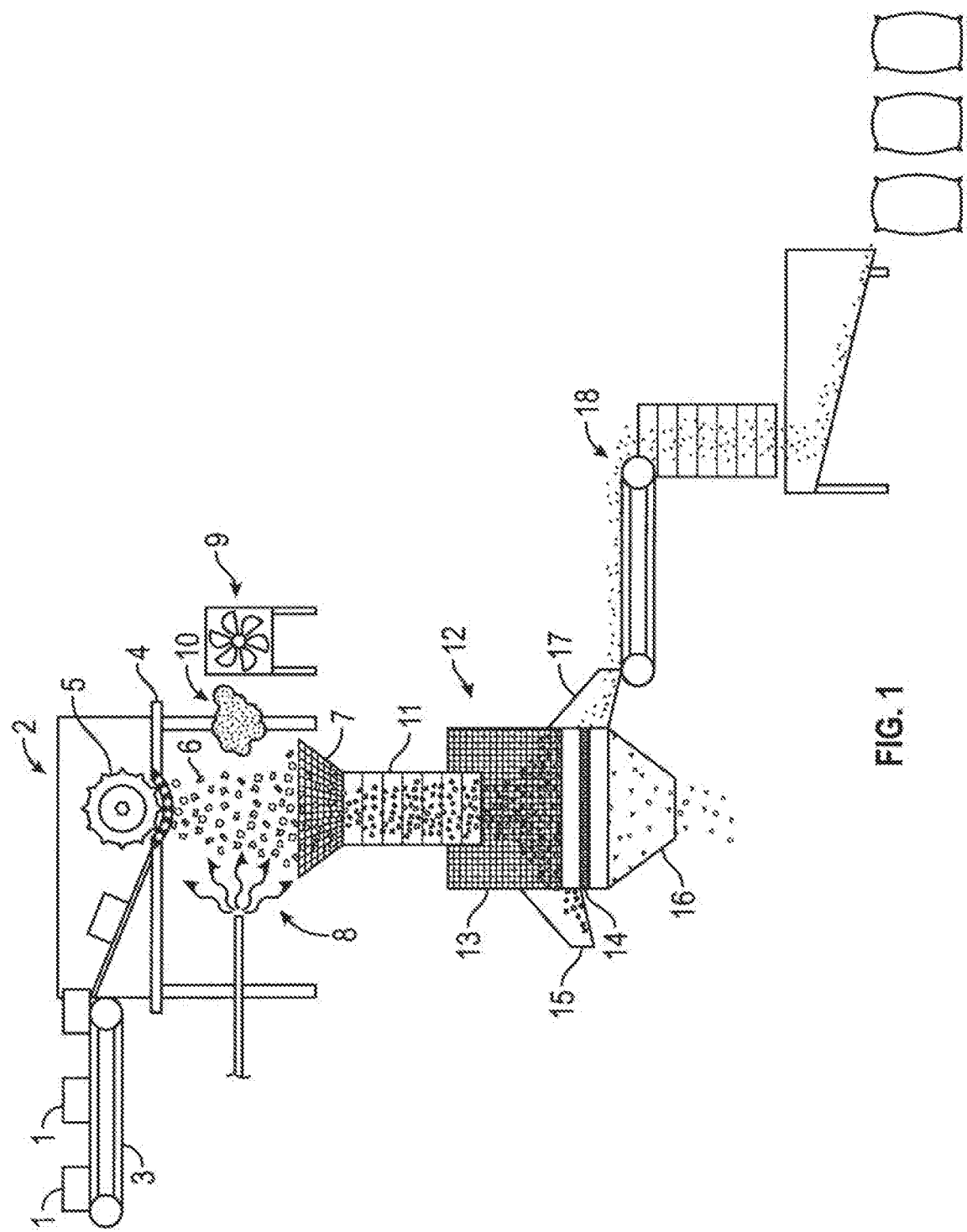
FIG. 1 is an exemplary schematic diagram of process equipment for carrying out the inventive concept(s).

The present disclosure is more particularly described in the following examples that are intended as illustrative only since numerous modifications and variations therein will be apparent to those skilled in the art. Various embodiments of the disclosure are now described in detail. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the disclosure. Additionally, some terms used in this specification are more specifically defined below.

The terms used in this specification generally have their ordinary meanings in the art, within the context of the disclosure, and in the specific context where each term is used.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including, but not limited to.

The described and claimed inventive concept(s) provide according to one embodiment a method for processing raw coconut coir pith into fine particles having a size range which can be from 0.001 mm to 0.02 mm up to 0.001 mm to 7 mm. As processed, the fine particles are suitable for use directly in a variety of industrial, commercial and agricultural/horticultural applications without the need for further processing, e.g., pre-composting. For example, raw coconut coir pith particles in a size range of from 0.001 mm to 5 mm can be used directly in cat/kitty litter when mixed with bentonite and guar gum, or other available clumping agents.

Coir pith is a ligno-cellulosic biomass formed during extraction of coir fiber from coconut husks. While coir pith has many beneficial characteristics, e.g., high moisture retention capacity, direct use of raw coir pith in agricultural and horticultural applications is not recommended because of its high C:N ratio, and its lignin and polyphenol content. Accordingly, one aspect of research to date has focused on co-composting the coir pith with other materials, such as, for example, poultry manure. Another aspect of research has focused on incorporating coir pith with peat moss for use as either a fluffed, "loose-fill" product or in a pre-compressed blend, which requires a subsequent decompression step or fluffing step for full utilization in an agricultural or horticultural setting.

The described and claimed inventive concept(s) result from the discovery that raw coconut coir pith having an initial neutral pH, meaning a pH in the range of from 5.7 pH to 6.5 pH, and a sodium salt content of not more than 0.3 wt %, can be processed into fine particulate form and used directly, for example, as a soil amendment or additive. Incorporation, or blending, of fine particulate raw coconut coir pith directly into a quantity of soil operates to improve the ability of the soil to retain water by up to 50% more than the same quantity of soil having no raw coconut coir pith.

The method comprises the steps of (a) providing a quantity of raw coconut coir pith, typically in compressed block form; (b) grinding the compressed blocks of coconut coir pith to form a ground product; (c) screening the ground product whereby intermediate product, e.g., flakes, particulates generally larger than 0.02 mm, and fibers are removed and fine particles (i.e. particulates ranging in size from 0.001 mm to 0.02 mm) remain; and (d) collecting the fine particles. The desired size range of particulates can be adjusted over wide range to meet the needs of specific applications by adjusting the screen sizes in the screening operation. The fine particles are generally uniform in size, they are flowable, and easy to convey and use.

According to one embodiment, the fine raw coir pith particles can be used for separating hydrocarbon and other chemical liquids from fresh or salt water that has been contaminated with one or more of such liquids. Such hydrocarbon liquids can include, for example, crude oil or diesel or other fuels and other hydrocarbon chemical liquids. This embodiment comprises a method whereby a quantity of fine raw coconut coir pith particles having a size range of from 0.001 mm to 5 mm are applied to the contaminated body of water with the result that hydrocarbon liquid present in the contaminated water is absorbed by the raw coconut coir pith particles. The application rate for the coconut coir pith fine particles can vary, although satisfactory results have been observed when the ratio of fine coconut coir pith particles to liquid contaminant is in the range of 2:1. The applied coconut coir pith particles now saturated with hydrocarbon liquid are then recovered from the water using any convenient means, such as, for example, skimming or filtering. Thereafter, the hydrocarbon liquid can be recovered, i.e., extracted, from the coconut coir pith particles by any convenient means, such as, for example, passing the saturated coconut coir pith through a belt press with the result that the absorbed liquid(s) are effectively squeezed from the coir pith solids for collection. A centrifuge can also be used for liquid extraction. Saturated coconut coir pith can also be dried naturally and then incinerated or used to generate power or heat.

Other contemplates uses for the fine coconut coir pith particles is as a kitty litter, or as an "oil dry" product which can be applied to work surfaces to absorb oils and other liquids which may have accumulated thereon. The used coconut coir pith particles are then collected and disposed of in any environmentally acceptable manner.

The fine coconut coir pith particles can also be formulated for agricultural/horticultural uses with one or more additives selected from the group consisting of water; one or more natural or synthetic fertilizers; one or more carbon materials; animal or poultry manure; poultry litter; one or more binding materials and mixtures thereof to form a bulk formulated product; and the bulk formulated product can be easily converted into granules, balls or prill value. The granules, balls or prill values are then packaged for commercial and residential distribution and use.

Raw coconut coir pith is commercially available in +1-10 lb. (5 kg) compressed blocks, typically 12"×12"×4" in size. As noted above, the raw coconut coir pith is tested using techniques known to those skilled in the art to insure that the pH of the material is within a neutral range, meaning a pH in the range of from 5.7 pH to 6.5 pH. In keeping with the described and claim inventive concept(s), the salt content of the raw coconut coir pith must not exceed 0.3 wt %. As used herein, the term "salt" is intended to mean sodium salt, although any other salt that would be detrimental to an intended use is included within the term "salt".

An embodiment of the process will now be described with reference to FIG. 1. Compressed blocks of raw coconut coir pith (available commercially from Cosmic Coir, for example) 1 are fed to a grinder system 2 using an automated belt 3 (e.g., Montgomery Blow Hog, available from Montgomery Industries, Jacksonville, Fla.). The grinder system 2 can be a machine mounted on an elevated platform 4 which comprises carbide grinding teeth 5, for example. The blocks are ground up, i.e., crushed, into a ground product 6, and the ground product 6 passes downwardly to a drop mounted screen 7 (first screen) having one-inch openings. At this stage the ground product 6 comprises three distinct material categories, being 5-10% fibers; 10-15% non-fiber intermediate ground product (i.e., flakes); and 70-75% fine particulates. As the ground product is discharged from the grinder system 2 into the drop mounted first screen 7, an air flow 8 is induced, or drawn, by a remotely positioned fan 9 through the discharging ground product at a flow rate of about 13,700 cfm and a pressure of from 3 to 7 psi with the result that ultra fine dust particles that would otherwise escape into the immediate surrounding atmosphere are removed from the processing area and contained.

The ground raw coconut coir pith product is then collected from the drop mounted screen (first screen) and passed via a second automated belt conveyor 11 to a double layer screen arrangement 12 (second screen) in which the raw ground material is separated according to size into at least three distinct components. The double layer screen arrangement comprises a first screen 13 at a first mesh (e.g., #4 mesh) arranged to receive the ground product from the incoming belt conveyor. A second screen 14 at a second and smaller mesh (e.g., #8 mesh) is arranged to receive the ground product which passes through the first screen 13. The double layer screen arrangement includes three outlets positioned integrally within the screen arrangement with the result that fibers pass into and are removed through the first outlet 15, non-fiber intermediate ground product passes into and is removed through second outlet 16, and fine particulates ranging in size from 0.001 mm to 0.02 mm pass into and are removed through the third outlet 17. The double layer screen arrangement can be constructed of stainless steel screens or from any other metallic or not metallic material which does not affect or interact with the raw coconut coir pith.

To achieve a desired size range of from 0.001 mm-7.0 mm of raw coir pith, the first drop mounted screen comprises a #4 screen and a #6 screen which allows big fibers and chunks and foreign material to be retrieved from the top screen outlet. The bottom layer screen #6 allows product larger than 7 mm in size to be collected from the 2nd outlet area, which, in turn, allows the raw coir pith product in the size range of from 0.001 mm-7 mm to be collected from 3rd outlet (bottom discharge) and belted to double layer screen arrangement 12.

Double layer screen arrangement 12 is a first #6 mesh screen to collect any possible larger product or foreign material that passed through the drop mounted screen. Then a second screen is a #50 mesh that allows a desired range of from 0.001 mm-7.0 mm to exit outlet 17 and be collected for use. Any product from outlet 17 is the desired range for use. Outlet 16 (bottom discharge area) yields a ground material that is collected for disposal.

The fine raw coconut coir pith particles 18 that result from the grinding and screening steps are then collected and packaged for use. According to the described and claimed inventive concept(s), the fine raw coir pith particles can be used directly as a soil additive or soil amendment, as a kitty litter, or as an oil dry product. The fine coconut coir pith particles can also be blended with other acceptable materials for a variety of uses, including, for example, as a soil additive, as a blended sand additive, as a deterrent for soil erosion, and as a liquid absorbent (e.g., for water, oil, diesel and other hydrocarbon fuels, greases, chemicals, and the like). Fine particulates which do not meet quality control requirements and non-fiber intermediate product can be recycled through the double layer screen arrangement.

According to one embodiment, the fine raw coir pith particles can be formulated with one or more additives for a wide range of agricultural and horticultural uses. Such additives are selected, for example, from the group consisting of water; one or more natural or synthetic fertilizers; one or more carbon based materials; animal or poultry manure; one or more binding materials and/or mixtures thereof to form a bulk formulated product. The bulk formulated product will comprise from about 4 wt % up to about 50 wt % of the raw coir pith particles that result from the grinding and screening steps, from at least about 75 wt % of natural or synthetic fertilizer, or a blend of such fertilizers, with the balance comprising from about 5 wt % up to 100 wt % of one or more of a carbon based material or other odor containment material, or a blend of such materials. The formulated bulk product is fed through a granulator or other suitable machine or device (e.g., pin mixer; agglomerator available from Mars Mineral, Mars, Pa.) to convert the bulk material into discreet prill form, granules, or balls typically ranging in size from one mm to 8 mm in diameter. Package sizes for handling and transporting the formulated material can range from 1 lb up to 2000 lb industrial totes. The prill, granules or balls are useful as a fertilizer for farms, golf courses and a variety of other uses where application can be accomplished using currently available small or large application equipment. The granulated product imparts fertilization and moisture retention into the soil with a single application.

Natural fertilizers for use according to the inventive concept(s) include, but are not limited to, organic fertilizers, such as cow manure and egg shells, and components of waste streams from industrial ice cream and poultry plants. Synthetic fertilizers include, for example, nitrogen, potash, and phosphate.

Carbon based materials for use in controlling potential odor problems, e.g., excess ammonia odor, according to the inventive concept(s) include, but are not limited to, activated carbon, activated charcoal, and granulated white carbon.

According to another embodiment, the described and claimed inventive concept(s) comprise a method for processing poultry manure from a poultry house for agriculturally and horticulturally acceptable uses. A typical poultry house can range in size from 16,000 ft$^2$ to 24,000 ft$^2$ or larger. The embodiment comprises first covering the floor of the poultry house with a depth of rice hulls or other suitable material of at least about one inch up to about 4 inches. A flock of poultry is then introduced into the poultry house for a poultry growing cycle of typically up to about twelve months. The rice hulls or other materials, and all resulting poultry manure, are then recovered from the poultry house at the end of the poultry growing cycle in the form of "poultry litter". The recovered poultry litter is then formulated with up to 5 wt % fine raw coconut coir pith particles that result from the grinding and screening steps described above. The formulation can also include from 5 wt % up to 15 wt % of one or more additives selected from the group consisting of water; natural or synthetic fertilizers; one or more carbon based materials; one or more binding materials and mixtures thereof to form a bulk formulated product. The bulk formulated product is then agglomerated into prill, balls or granules typically ranging in size from one mm to 3 mm in diameter.

EXAMPLES

As noted above, incorporating the fine raw coconut coir pith particles into a sample of clean soil can improve the ability of the soil sample to retain water by up to 50% over the water retention capability of the same soil sample in the absence of coconut coir pith particles. The term "clean soil" is used herein to mean a soil sample which does not contain coconut coir pith particles, but in all other respects the soil samples used in the examples were identical in their respective compositions.

Example 1

A saturation test was conducted according to which a clean soil sample measuring 3 inches in depth and covering an area of 1 square foot was prepared. The soil sample weighed 5 lb. A second sample of clean soil was prepared to which was added 0.015 lb of fine raw coir pith particles ranging in size from 0.001 mm to 5 mm. The second sample of clean soil and the raw coconut coir pith particulates were thoroughly mixed. A first clear glass column measuring 6 inches long was then filled with just clean soil, and a second clear glass column measuring 6 inches long was filled with [[the]] a uniform mixture of clean soil plus raw coconut coir pith particulates. Water was then introduced into each tube until the contents of each was fully saturated, and the corresponding amounts of water were recorded.

Figure 2:
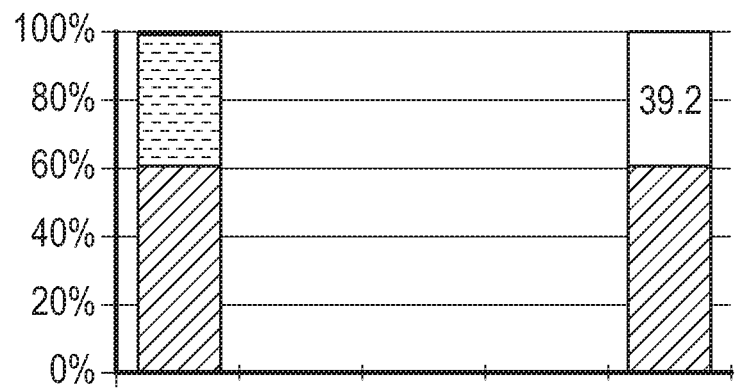
FIG. 2 depicts Table 1, being results from Example 1 to indicate that for the first sample of clean soil only, water retention was 25%.

The results can be seen in Table 1 shown in FIG. 2 which indicates that for the first sample of clean soil only, water retention was 25%.

Figure 3:
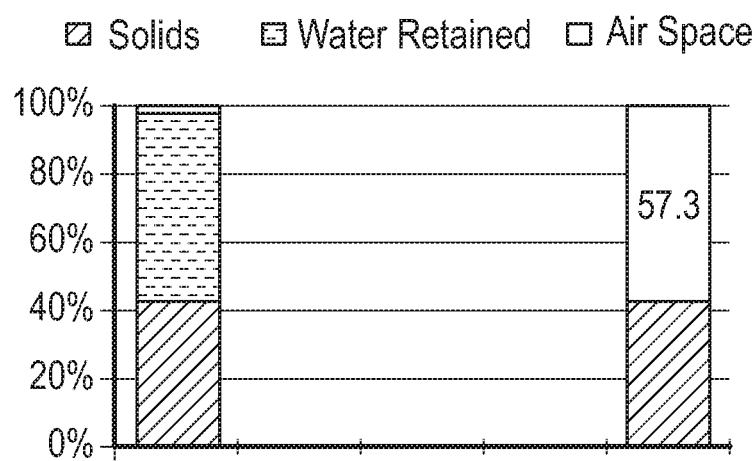
FIG. 3 depicts Table 2, being results from Example 1 to indicate that for the second sample of clean soil plus raw coconut coir pith particulates, water retention was 55%.

The results can be seen in Table 2 shown in FIG. 3 which indicates that for the second sample of clean soil plus raw coconut coir pith particulates, water retention was 55%.

It should be understood that various changes and modifications to the presently preferred embodiments described herein will be apparent to those skilled in the art. Such changes and modifications can be made without departing from the spirit and scope of the described inventive concept(s) and without diminishing its intended advantages. It is therefore intended that such changes and modifications be covered by the appended claims.

What is claimed is:

1. A method for processing raw coconut coir pith into fine particles having a size range of from 0.001 mm to 7 mm which comprises:
   (a) providing a quantity of raw coconut coir pith wherein said raw coconut coir pith has a pH in the range of from 5.7 pH to 6.5 pH and a salt content of not more than 0.03 wt %;
   (b) grinding the raw coconut coir pith to form a ground product;
   (c) screening the ground product in a screening system comprising a first drop mounted screen at #4 mesh arranged to receive the ground product from step (b) and a second screen at #6 mesh arranged to receive the ground product which passes from the first drop mounted screen,
   (d) passing the ground product from step (c) to a double layer screen arrangement having a first #6 mesh screen and a second #50 mesh screen, said screening system including three outlets positioned within the system with the result that fibers pass into the first outlet, non-fiber intermediate product passes into the second outlet, and said fine particles which exit from second #50 mesh screen having a size range of from 0.001 mm to 7 mm pass into the third outlet; and
   (e) collecting the fine particles.

2. The method of claim 1 which includes the additional step of blending the ground coconut coir pith fine particles from step (e) with horticulturally acceptable non-coir materials selected from a group consisting of one or more of natural or synthetic fertilizers; one or more carbon based materials; animal or poultry manure; one or more binding materials, and mixtures thereof to produce a blended bulk material, and converting the blended bulk material into granules, balls or prills.

3. The method of claim 2 in which the blended bulk material contains from 4 wt % to 50 wt % ground coconut coir pith particles.

4. The method of claim 1 which includes the additional step of blending the ground coconut coir pith fine particles from step (e) with a clumping agent.

5. The method of claim 4 wherein the clumping agent is selected from the group consisting of bentonite and guar gum and mixtures thereof.

\* \* \* \* \*